(12) United States Patent
Li

(10) Patent No.: US 7,840,079 B2
(45) Date of Patent: Nov. 23, 2010

(54) SEAMLESS MULTIPLEXING OF EMBEDDED BITSTREAMS

(75) Inventor: Jin Li, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 12/348,777

(22) Filed: Jan. 5, 2009

(65) Prior Publication Data

US 2009/0110007 A1    Apr. 30, 2009

Related U.S. Application Data

(62) Division of application No. 10/600,555, filed on Jun. 20, 2003, now Pat. No. 7,496,234.

(51) Int. Cl.
*G06K 9/36* (2006.01)

(52) U.S. Cl. ........................... 382/233; 382/232

(58) Field of Classification Search ................. 382/232, 382/233, 240, 248; 370/537
See application file for complete search history.

(56) References Cited

U.S. PATENT DOCUMENTS 5,659,634 A * 8/1997 Yeh et al. .................... 382/233
6,611,624 B1 * 8/2003 Zhang et al. ................ 382/232

OTHER PUBLICATIONS

Shapiro, J., "Embedded Image Coding Using Zerotrees of Wavelet Coefficients", IEEE Trans. on Signal Processing, vol. 41, pp. 3445-3462, Dec. 1993.
Taubma, D., "High performace scalable image compression with EBCOT", IEEE Trans. on Image Processing, vol. 9, No. 7, pp. 1158-1170, Jul. 2000.
Li, J. and Sun, H., "On Interactive Browsing of Large Images", IEEE Trans. on Multimedia, vol. 5, No. 4, pp. 581-590, Dec. 2003.
Li, J. and Lei, S., "An embedded still image coder with rate-distortion optimization", IEEE Trans. on Image Processing, vol. 8, No. 7, pp. 913-924, Jul. 1999.

* cited by examiner

*Primary Examiner*—Duy M Dang
(74) *Attorney, Agent, or Firm*—Lyon & Harr, LLP; Mark A. Watson

(57) ABSTRACT

A "seamless multiplexer," as described herein, provides a flexible and efficient system and method for multiplexing embedded coded bitstreams. Further, unlike the conventional JPEG 2000 standard, the seamless multiplexer is capable of decoding multiplexed encoded bitstreams without the need to use a demultiplexing aide as overhead in the encoded signal. In general, the seamless multiplexer provides a novel approach for multiplexing code block bitstreams by using a "decoder pointer," for multiplexing multiple embedded bitstreams without the use of a demultiplexing aide. Consequently, the seamless multiplexer not only reduces any multiplexing overhead, but also allows much smaller granularity of access in reshaping the compressed input signal. In addition, in one embodiment, the seamless multiplexer also uses dependencies between coefficient blocks to further improve overall compression efficiency.

12 Claims, 7 Drawing Sheets

SEAMLESS MULTIPLEXING OF EMBEDDED BITSTREAMS

CROSS REFERENCE TO RELATED APPLICATIONS

This application is a Divisional Application of U.S. patent application Ser. No. 10/600,555, filed on Jun. 20, 2003, by Jin Li, and entitled "A SYSTEM AND METHOD FOR SEAMLESS MULTIPLEXING OF EMBEDDED BITSTREAMS," now U.S. Pat. No. 7,496,234 and claims the benefit of that prior application under Title 35, U.S. Code, Section 120.

BACKGROUND

1. Technical Field

The invention is related to a system for media compression, and in particular, to an efficient scheme to multiplex multiple embedded coded bitstreams, to improve the compression efficiency, and to reduce the granularity of access for an embedded compressed bitstream.

2. Related Art

Embedded coding has the attractive property that a lower rate compressed bitstream is embedded, usually as a prefix, in a higher rate compressed bitstream. The higher rate compressed bitstream can thus be converted to a lower rate bitstream through simply truncation. The embedded coding thus enables the compressed bitstream to be manipulated quickly after the bitstream has been generated. There are a number of conventional schemes for embedded coding of bitstreams. Embedded coding is usually achieved by splitting transform coefficients of a signal into an array of bits, first encoding the more significant bits of all coefficients, and then gradually encoding the less significant bits for producing a compressed bitstream version of the input signal. Using such a coding order, if the resulting compressed bitstream is truncated, then at least a portion of all encoded coefficients will still be available for decoding. Consequently, the compressed bitstream can therefore be truncated at any point with a graceful tradeoff between the distortion and the coding rate.

One conventional scheme for embedded image coding is the well known JPEG 2000 image compression standard, which takes embedded coding, and thus the capability of manipulating a compressed bitstream to a whole new level. This embedded coding standard not only offers good compression performance, but also provides incredible flexibility. For example, the compressed bitstream of JPEG 2000 can be scaled in different bitrate, resolution, and spatial regions of interest (ROI). As is known to those skilled in the art, this flexibility is the result of applying embedded media coding to coefficient blocks, and then assembling the resultant bitstream, which provides the core architecture of the JPEG 2000 image compression standard.

In operation, JPEG 2000 compression first divides an image into a number of code blocks, where each code block is a rectangular block of coefficients in a wavelet subband. Every code block is then independently encoded by an embedded coder into a "code block bitstream," each of which has the embedding property that it can be truncated at arbitrary points. The embedded code block bitstreams are then multiplexed together to form the combined bitstream of JPEG 2000. Further, because the JPEG 2000 compressed bitstream is a collection of bitstream pieces of the code blocks, it can be flexibly reshaped in multiple aspects. Such flexibility of the compressed bitstream has important applications, such as, for example, internet browsing of images, where a server can quickly reshape a compressed image to a desired quality, resolution, and ROI, as requested by a client device.

The price of the incredible flexibility of the JPEG 2000 standard is the need to include a "demultiplexing aide" as overhead in the compressed bitstream to allow for decoding of the compressed signal. In particular, in order to decode a JPEG 2000 compressed signal, a demultiplexing aide, such as the length and the number of coding passes of the multiplexed bitstream pieces, is inserted into the compressed bitstream so that it can be demultiplexed and decoded. This demultiplexing aide can be considered as an overhead or a penalty paid for the bitstream flexibility. Further, as the bitstream pieces become smaller, the overhead of the demultiplexing aide increases in proportion to the final bitstream.

One way to reduce the overhead of the demultiplexing aide in proportion to the information encoded in the bitstream is to use larger code blocks and/or fewer layers of bitrate scalability. Unfortunately, this tradeoff results in poor granularity of access for the decoded signal. Further, this directly contradicts one of the main benefits of JPEG 2000, namely, bitstream flexibility. Further, since the code block resides in the wavelet subband, the corresponding spatial ROI can be particularly large. Using the default parameter of JPEG 2000 as an example, a default code block of size 64×64 at the top resolution level of a default 5-level wavelet transform results in a spatial ROI of size 2048×2048. Unfortunately, this is too large for most application sceneries. Another shortcoming of the bitstream multiplexing scheme of JPEG 2000 is that its code block has to be independently encoded and decoded. Consequently, any existing dependencies among the neighboring code blocks, and across resolutions, are not considered by JPEG 2000, thereby reducing compression efficiency.

Consequently, what is needed is a system and method for encoding bitstreams without the need to use a demultiplexing aide in the encoded bitstream while maintaining the same flexible access of the compressed bitstream. Further, dependencies among coefficient blocks in this system and method should be considered in encoding the bitstreams, so as to improve overall compression efficiency.

SUMMARY

A "seamless multiplexer," as described herein, provides a flexible and efficient system and method for encoding bitstreams without the need to use a demultiplexing aide as overhead in the encoded signal for decoding a signal that is compressed using the seamless multiplexer. In general, the seamless multiplexer provides a novel approach for multiplexing code block bitstreams by using a "decoder pointer," for multiplexing multiple embedded bitstreams without the use of a demultiplexing aide. Consequently, the seamless multiplexer not only reduces any overhead of multiplexing, but also allows much smaller granularity of access of the compressed input signal. In addition, in one embodiment, the seamless multiplexer also uses dependencies between coefficient blocks to further improve overall compression efficiency.

Unlike conventional coding schemes, such as JPEG 2000, the seamless multiplexer provides a system and method for multiplexing multiple embedded bitstreams without the need to add a demultiplexing aide to the packet header for successful decoding of the bitstream. In general, this multiplexing is accomplished by using a decoder pointer rather than an encoder pointer to mark the end of each coding pass, and then using the decoder pointer for synchronizing when multiple embedded bitstreams are multiplexed together. Further, also unlike conventional schemes such as JPEG 2000, this seamless multiplexing is accomplished without requiring use of a coding distortion, $d_p$, at the end of each coding pass.

As with JPEG 2000, and other conventional coding schemes, the first step performed by the seamless multiplexer is to decompose an input signal (audio, image, video, etc.) using a transform, e.g., with a wavelet transform. A number of transform coefficients with the same statistical property and/or locality of the spatial/resolution are then grouped into code blocks, with each code block being composed of a number of coefficients. For example, with wavelet transforms, a code block is a rectangular region of coefficients within each wavelet subband. With such rules for forming the code blocks, it is possible to convert a region of interest (ROI) access of the image into the access of code blocks located at different resolution wavelet subbands and different spatial regions. At this point, conventional coders such as JPEG 2000 typically use an embedded multi-pass encoder for encoding each code block. However, unlike conventional coders, the seamless multiplexer employs a modified entropy coder which generates a decoder pointer as each code block is encoded. In general, the decoder pointer simply marks the end of each coding pass.

Any type of entropy coder may be modified to produce the decoder pointer during the encoding operation. For example, entropy coders, such as an arithmetic coder, or a run-length coder, are easily modified to produce a decoder pointer during initial entropy coding. In a tested embodiment, a modified QM arithmetic encoder and decoder was used to produce a decoder pointer at the end of each coding pass. Further, the QM arithmetic coder flush process was modified to ensure that the compressed bitstream is sufficiently long to allow it to be multiplexed.

It should be noted that in one embodiment, a conventional entropy coder/decoder can also be used to generate decode pointers without modification. In particular if a conventional entropy coder is used, then as soon as each bitstream is encoded, it is simply decoded by the corresponding decoder, and the decode points are then recorded. However, this method is comparatively less efficient as it requires an additional decode step.

In either case, the decoding pointer is then used in multiplexing the encoded bitstreams of the code blocks. Further, in contrast to conventional multiplexing schemes, such as that described with respect to the JPEG 2000 multiplexing scheme, the seamless multiplexer does not include overhead information or headers between each multiplexed bitstream piece. In fact, the seamless multiplexer instead produces an encoded bitstream from the input signal that includes a sequential multiplexing of individual encoded media blocks separated by decoder pointers.

DESCRIPTION OF THE DRAWINGS

The specific features, aspects, and advantages of the present invention will become better understood with regard to the following description, appended claims, and accompanying drawings where:

DETAILED DESCRIPTION OF THE PREFERRED EMBODIMENTS

In the following description of the preferred embodiments of the present invention, reference is made to the accompanying drawings, which form a part hereof, and in which is shown by way of illustration specific embodiments in which the invention may be practiced. It is understood that other embodiments may be utilized and structural changes may be made without departing from the scope of the present invention.

Figure 1:
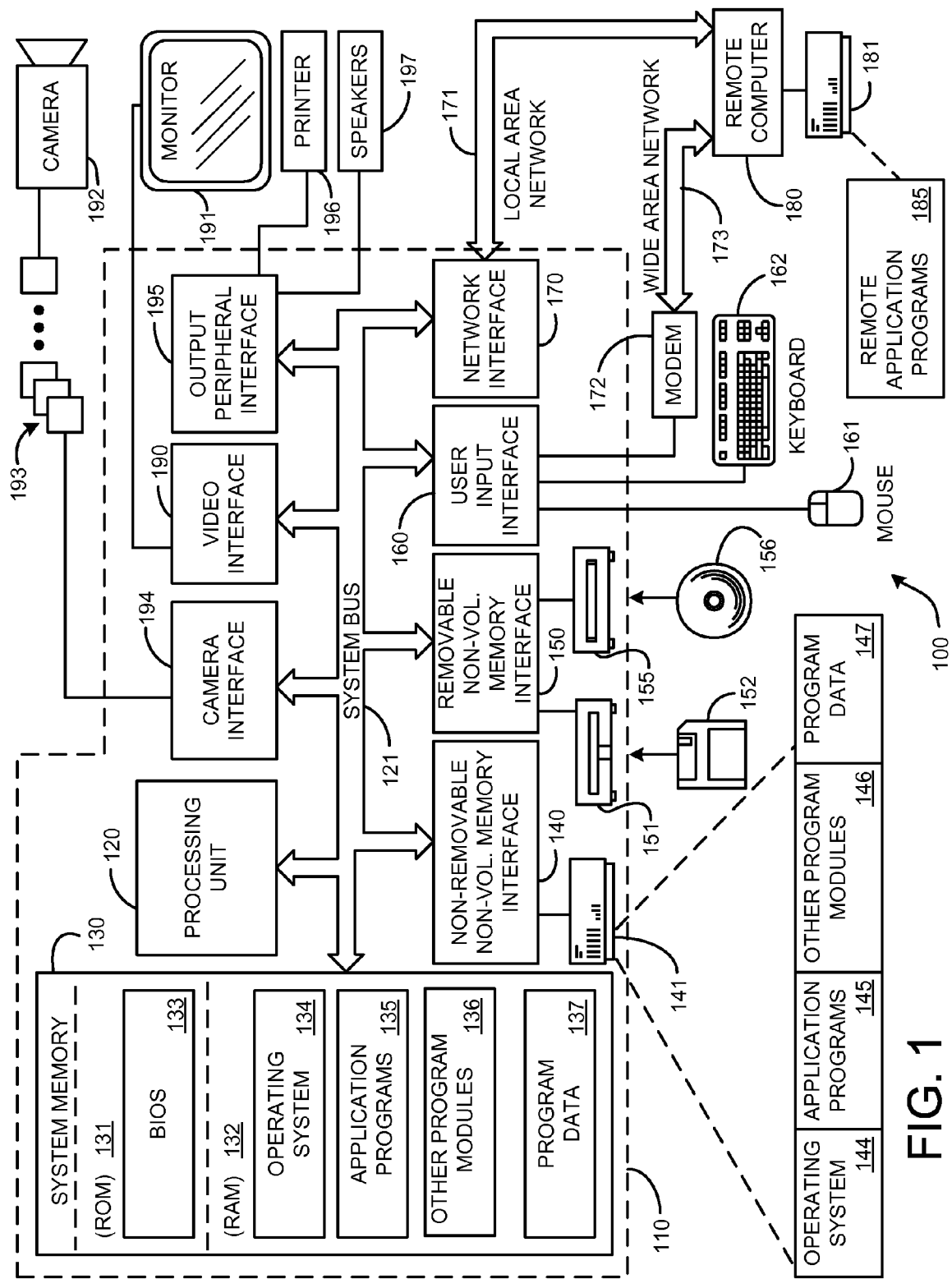
FIG. 1 is a general system diagram depicting a general-purpose computing device constituting an exemplary system for providing seamless multiplexing of encoded bitstreams.

1.0 Exemplary Operating Environment:

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held, laptop or mobile computer or communications devices such as cell phones and PDA's, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices. With reference to FIG. 1, an exemplary system for implementing the invention includes a general-purpose computing device in the form of a computer 110.

Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile removable and non-removable media implemented in any method or technology for storage of information such as computer readable instructions, data structures, program modules or other data.

Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media.

The aforementioned term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/ nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

Further, the computer 110 may also include, as an input device, a camera 192 (such as a digital/electronic still or video camera, or film/photographic scanner) capable of capturing a sequence of images 193. Further, while just one camera 192 is depicted, multiple cameras could be included as input devices to the computer 110. The use of multiple cameras provides the capability to capture multiple views of an image simultaneously or sequentially, to capture three-dimensional or depth images, or to capture panoramic images of a scene. The images 193 from the one or more cameras 192 are input into the computer 110 via an appropriate camera interface 194. This interface is connected to the system bus 121, thereby allowing the images 193 to be routed to and stored in the RAM 132, or any of the other aforementioned data storage devices associated with the computer 110. However, it is noted that image data can be input into the computer 110 from any of the aforementioned computer-readable media as well, without requiring the use of a camera 192.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

The exemplary operating environment having now been discussed, the remaining part of this description will be devoted to a discussion of the program modules and processes embodying a "seamless multiplexer."

2.0 Introduction:

In general, the "seamless multiplexer" described herein provides a flexible and efficient system and method for multiplexing encoding bitstreams. Further, unlike the conventional JPEG 2000 standard, the seamless multiplexer is capable of demultiplexing and decoding encoded bitstreams without the need to use a demultiplexing aide as overhead in the encoded signal. In general, the seamless multiplexer provides a novel approach for multiplexing code block bitstreams by using a "decoder pointer," for multiplexing multiple embedded bitstreams without the use of a demultiplexing aide. Consequently, the seamless multiplexer not only reduces any multiplexing overhead, but also allows much smaller granularity of access in decoding truncated copies of the compressed input signal. In addition, in one embodiment, the seamless multiplexer also uses dependencies between coefficient blocks to further improve overall compression efficiency.

Input signals are comprised of a number of components. For example, a stereo audio signal typically includes an L+R channel and an L−R channel. Each channel of audio signal may be further transformed by a modulated lapped transform, and divided into three sampling rate levels, e.g., full, half, and quarter sampling. Thus, the audio signal will be represented by six components. In particular, a mono signal (L+R) at full, half, and quarter sampling, and a stereo signal (L+R and L−R) at full, half, and quarter sampling. Further, a typical image may be decomposed via color decomposition into color (U,V) and gray (Y) component, each component image may then be decomposed through wavelet transform into a number of wavelet band, with each wavelet subband further divided into a number of code blocks with each code block be a rectangular region of coefficients in the wavelet subband. Thus, the image may be represented by a number of components, such as, for example, color or grayscale, image resolution and different spatial regions of interest. Similarly, a video sequence may be represented by a number of components, such as, for example, color or grayscale, image resolution, and frame rate.

The seamless multiplexer operates by compressing the input signal one time, using one bitstream for every component of the input signal. These component bitstreams are then multiplexed using decoder pointers to create a "master bitstream." The master bitstream is then reshaped, as desired, to provide any desired bitrate or form based on those components. Therefore, the first step is to decompose the input signal into its N constituent components. These components are then encoded using an entropy encoder, such as an arithmetic or run-length coder that is modified to generate decoding pointers at the end of each coding pass. The individual bitstreams produced by coding each component are then multiplexed into the aforementioned master bitstream using the decoder pointers to synchronize the multiplexing of the individual bitstreams.

Then, when it is desired to reshape the input signal to provide a desired bitrate, the multiplexed bitstream is simply truncated. In contrast, in order to reshape the input signal such as by scaling the resolution of an image, providing a stereo audio signal as a mono signal, or providing a color video signal as a grayscale video signal, etc., the multiplexed signal is first demultiplexed, and any components not desired in the final output signal are then simply dropped. Next, the remaining components are simply recoded, again using the aforementioned entropy coders, and multiplexed using the decoder pointers, to create a "reshaped bitstream" that, when decoded, provides the desired form (e.g., a mono audio signal by dropping the L−R component).

It should be noted that the master bitstream does not contain the information needed to drop particular code block bitstreams (e.g., components) without performing the entropy decoding operation. Further, for manipulations such as scaling by resolution or accessing an image using a spatial ROI, the length of the corresponding bitstream piece is still required. However, rather then encoding such information in the master bitstream (as is done with coding schemes such as JPEG 2000), that information is instead stored in a separate portion of the file termed a "companion bitstream." This companion bitstream includes all information necessary for reshaping the master bitstream to provide the desired form of the decoded output signal. Note that the information in the companion bitstream is roughly equivalent to the "demultiplexing aide" of the JPEG 2000 standard.

However, unlike the "demultiplexing aide" of the JPEG 2000 standard, the information in the companion bitstream of the seamless multiplexer is not embedded in the master bitstream. In fact, the only use for the companion bitstream is to provide the necessary information for reshaping the master bitstream. Once reshaped, the fact that reshaped bitstream is generated via a multiplexing process that makes use of the decoder pointers serves to allow the reshaped bitstream to be subsequently decoded without any further use of the companion bitstream. Therefore, while much of the information is stored in the companion bitstream is the roughly equivalent to the information represented by the "demultiplexing aide" of the JPEG 2000 standard, the reshaped bitstream of the seamless multiplexer is significantly smaller than an equivalent bitstream, produced by a JPEG 2000 compliant encoder, precisely because it does not include the companion bitstream within that reshaped bitstream. Clearly, a smaller bitstream provides a significant advantage in applications where the reshaped bitstream is to be transmitted across a network such as the Internet.

2.1 System Overview:

The following discussion provides a brief overview of the operation of the JPEG 2000 standard, followed by a discussion of the operation of the seamless multiplexer. This JPEG 2000 overview is provided for purposes of explanation in order to highlight differences between JPEG 2000 and the seamless multiplexer described herein.

Figure 2:
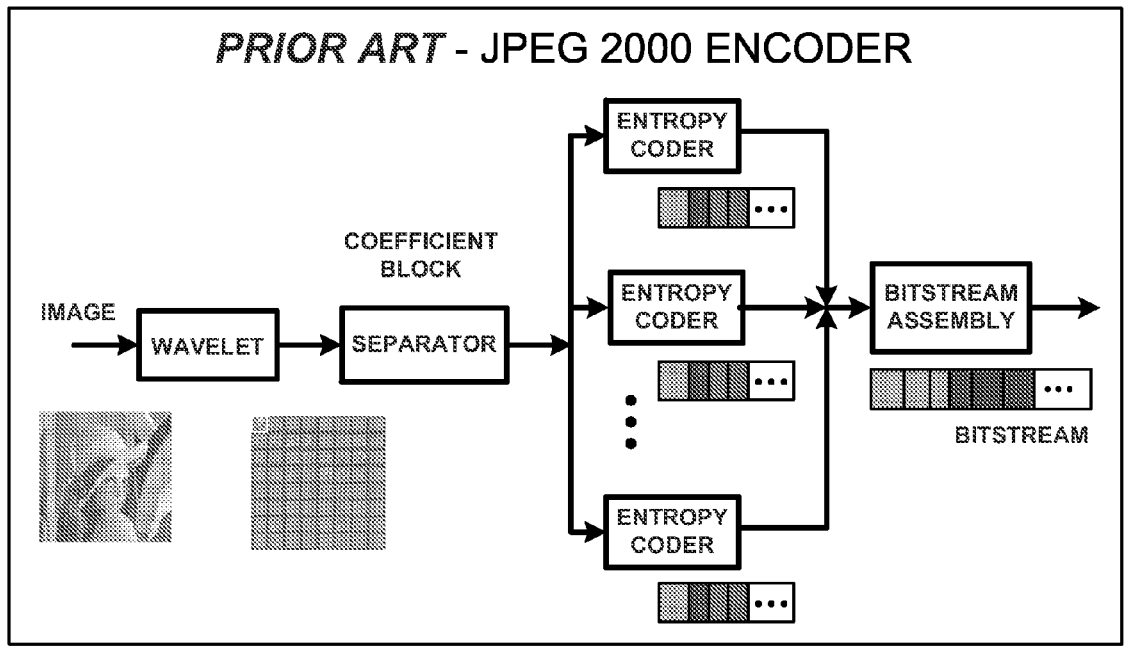
FIG. 2 is a PRIOR ART block diagram that represents a conventional encoder such as a JPEG 2000 encoder.

2.1.1 JPEG 2000 Summary:

As is well known to those skilled in art, JPEG 2000 achieves decoding flexibility by multiplexing multiple code block bitstreams which can be truncated at any point, and then decoded to provide a desired granularity for the decoded signal. For example, a conventional JPEG 2000 encoder, as illustrated by Prior Art FIG. 2, first decomposes an image into a pyramidal wavelet transform. Each wavelet subband is then split into code blocks, each of which consists of a rectangle array of coefficients within a wavelet subband. After that, each code block is encoded by a multi-pass embedded coder. The bitstream between two successive coding passes is referred as a "bitstream piece." A bitstream assembler multiplexes the bitstream pieces of the code blocks together to form the combined bitstream of JPEG 2000.

By arranging the bitstream pieces according to the descending order of a conventional rate-distortion (R-D) slope, the combined JPEG 2000 bitstream has a scalable bitrate property. In other words, the combined bitstream can be truncated to generate a bitstream of lower coding rate. By dropping the bitstream pieces of the code blocks that are at a higher resolution or outside of a certain spatial region of interest (ROI), the combined bitstream can be reshaped to that of a lower resolution or spatial ROI. Further, the operations described above can also be combined, such that the compressed bitstream of JPEG 2000 can be reshaped in terms of coding bitrate, resolution, spatial ROI, or any combination of these properties.

To achieve efficient compression and flexible bitstream manipulation, JPEG 2000 address key issues: 1) how each code block is encoded and decoded; and 2) how the code block bitstreams are multiplexed together.

Figure 3:
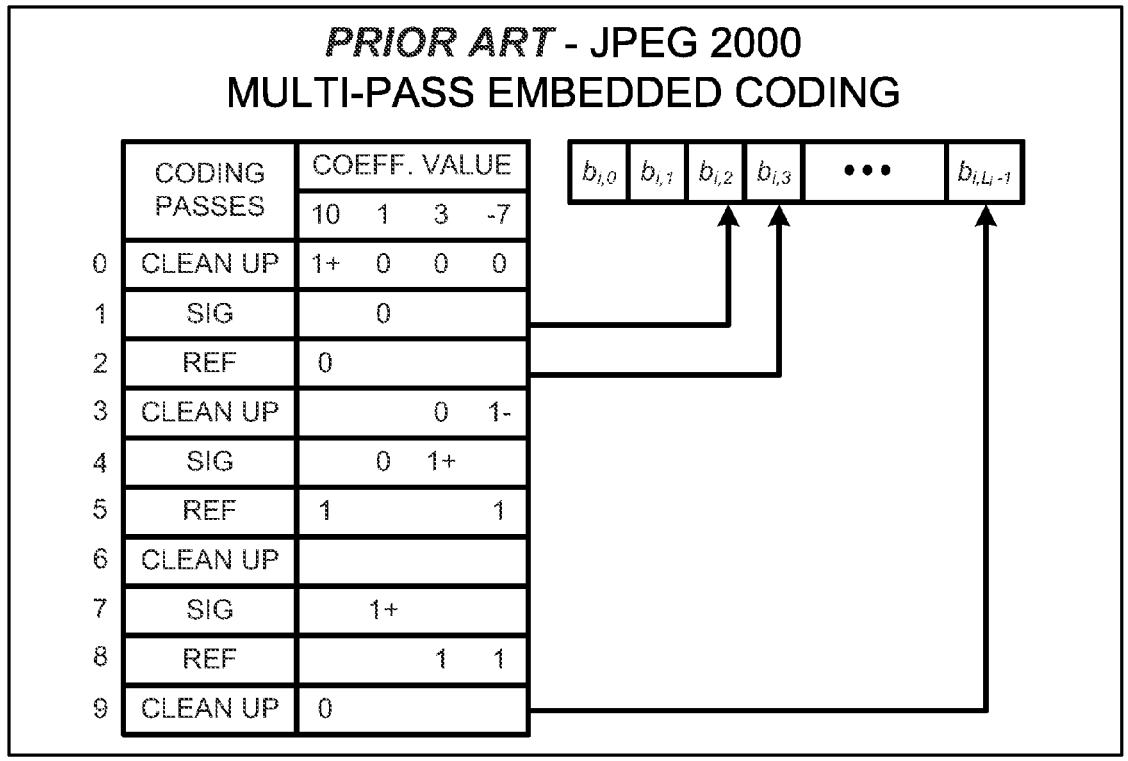
FIG. 3 is a PRIOR ART table and assembled bitstream that represents conventional JPEG 2000 multi-pass embedded coding.

In particular, JPEG 2000 uses a multi-pass code block encoder and decoder, as illustrated by Prior Art FIG. 3, where the left part of the figure is taken from Table D-6 of the JPEG 2000 Standard document ("JPEG 2000 Part I Final Committee Draft Version 1.0", March 2000, http://www.jpeg.org/public/fcd 15444-1. pdf). Prior Art FIG. 3 illustrates how the coefficients of the code block are split into a set of bits which corresponds to the binary representation of the magnitude and the sign of the coefficient. This set of bits is further grouped into multiple passes, where the R-D contribution of the bits is relatively the same within each pass.

In JPEG 2000, a multi-pass coder then encodes each bitplane with three passes, in the order of: 1) the significance (SIG) pass; 2) the refinement (REF) pass; and 3) the clean up pass. Consequently, a code block with M bitplanes is encoded with a total of 3M−2 coding passes. At the end of each coding pass p, JPEG 2000 records the current distortion $d_p$ and the current coding rate $r_p$. For a particular bitstream piece p that is between two successive coding passes p−1 and p, its R-D contribution is calculated through the R-D slope as illustrated by Equation 1:

$$s_p = -(d_p - d_{p-1})/(r_p - r_{p-1}) \qquad \text{Equation 1}$$

JPEG 2000 then multiplexes the bitstream pieces of the code blocks according to the descending order of their R-D slopes. The bitstream pieces for a particular resolution of a certain R-D slope range are then packaged into a network packet. In addition, information is inserted into the packet header with regard to subsequent bitstream pieces. Some of this information, referred to as "lead information," is related to joint characteristics of the code blocks, such as the maximum bitplane values of code blocks that are encoded through a tagtree coder. Other information inserted into the packet header, referred to as a "demultiplexing aide," is used for demultiplexing and decoding of the combined bitstream. This demultiplexing aide includes information such as the length of the bitstream piece and the number of coding passes of each code block. Without the information provided by the demultiplexing aide, the combined bitstream can not be separated into the bitstream of individual code blocks for decoding. This demultiplexing aide is also the information that allows reshaping of the JPEG 2000 compressed bitstream. Therefore, the demultiplexing aide is considered as an overhead or a penalty paid for the bitstream flexibility.

Extensive efforts have been made with JPEG 2000 to reduce the size of the packet header. One effective way is to use relatively large code blocks (such as 64×64) and/or fewer bitrate layers, so that the demultiplexing aide is proportionally insignificant with respect to the bitstream piece of the code block. However, this approach results in poor granularity of access. Further, because the code block bitstream is independently truncated in the bitstream assembler, each code block has to be independently encoded. Consequently, any dependencies among the code blocks and/or across wavelet resolution levels can not be used to boost compression performance of a JPEG 2000 wavelet coder.

2.1.2 Seamless Multiplexer:

Unlike JPEG 2000, the seamless multiplexer provides a system and method for multiplexing multiple embedded bitstreams without the need to add a demultiplexing aide to the packet header for successful decoding of the bitstream. In general, this multiplexing is accomplished by using a decoder pointer rather than an encoder pointer to mark the end of each coding pass, and then using the decoder pointer for synchronizing when multiple embedded bitstreams are multiplexed together. Further, also unlike conventional schemes such as JPEG 2000, this seamless multiplexing is accomplished without using the coding distortion, $d_p$, at the end of each coding pass.

As with JPEG 2000, and other conventional coding schemes, the first step performed by the seamless multiplexer is to decompose a signal (audio, image, video, etc.) using a transform. The transform coefficients are then separated into code blocks. In the case of image coding, the transform applied is the wavelet transform. Each wavelet subband is then split into code blocks, with each code block being composed of a number of coefficients of a certain spatial location. In the case of audio coding, the transform is first through channel decomposition and then modulated lapped transform (MLT) of each individual channel. The transform coefficients are then split into code blocks, with each code block being composed of a number of coefficients of a certain frequency range of a specific channel. At this point, conventional coders such as JPEG 2000 typically use an embedded multi-pass encoder for encoding each code block. However, unlike conventional coders, the seamless multiplexer employs a modified entropy coder to generate a decoder pointer as each code block is encoded. In general, the decoder pointer simply marks the end of each coding pass.

Any type of entropy coder may be modified to produce the decoder pointer during the encoding operation. For example, entropy coders, such as an arithmetic coder, or a run-length coder, are easily modified to produce a decoder pointer during initial entropy coding. An example of a modified QM arithmetic encoder and decoder is provided in Section 3.1.2. This modified QM arithmetic encoder/decoder is modified to produce a decoder pointer at the end of each coding pass. Further, the QM arithmetic coder flush process is modified to ensure that the compressed bitstream is sufficiently long to allow it to be multiplexed.

It should be noted that in one embodiment, a conventional entropy coder/decoder can also be used to generate decode pointers without modification. In particular if a conventional entropy coder is used, then as soon as each bitstream is encoded, it is simply decoded by the corresponding decoder, and the decode pointers are then recorded. However, this method is comparatively less efficient as it requires an additional decode step.

In either case, the decoding pointer is then used in multiplexing the encoded bitstreams of the code blocks, as described in detail in Section 3.1.1. Further, in contrast to conventional multiplexing schemes, such as that described with respect to the JPEG 2000 multiplexing scheme, the seamless multiplexer does not include overhead information or headers between each multiplexed bitstream piece. In fact, the seamless multiplexer instead produces an encoded bitstream from the input signal that includes a sequential multiplexing of individual encoded media blocks separated by decoder pointers. Again, this process is described in detail in Section 3.1.1 and 3.1.2.

Figure 4:
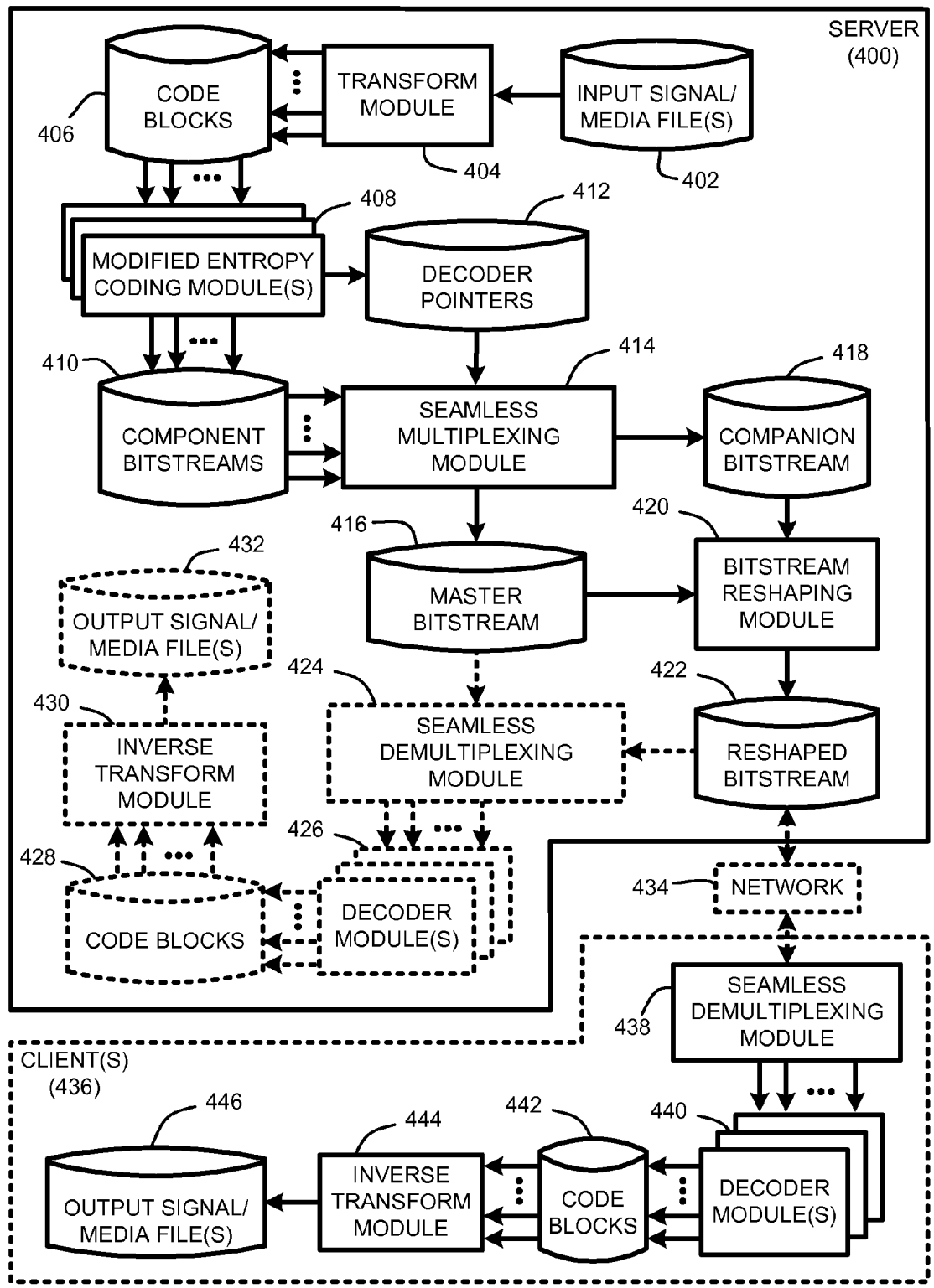
FIG. 4 illustrates an exemplary architectural diagram showing exemplary program modules for providing seamless multiplexing of encoded bitstreams.

2.2 System Architecture:

The general system diagram of FIG. 4 illustrates the processes summarized above. In particular, the system diagram of FIG. 4 illustrates the interrelationships between program modules for implementing an entropy-coder based seamless multiplexer. It should be noted that the boxes and interconnections between boxes that are represented by broken or dashed lines in FIG. 4 represent alternate embodiments of the seamless multiplexer methods described herein, and that any or all of these alternate embodiments, as described below, may be used in combination with other alternate embodiments that are described throughout this document.

As illustrated by FIG. 4, in one embodiment, a system and method for seamless multiplexing is described in the context of a server 400 client 436 relationship in order to illustrates advantages of the seamless multiplexer in a networking environment. However, it should be appreciated by those skilled in the art, that the entire seamless multiplexer may be implemented on a single computing device, such as server 400 without the need to communicate with a client computer 436 across a network 434 such as the Internet.

In general, the seamless multiplexing of bitstreams begins by providing an input signal 402 to a transform module 404. As discussed above, the input signal may be any type of signal for which entropy coding is appropriate. For example, such coding is frequently used with media type signals, such as audio signals of one or more channels, image signals, or video signals. The transform module 404 uses conventional transform techniques, such as conventional wavelet transforms to decompose the input signal into one or more code blocks 406 representing each of the individual components comprising the input signal 402. In particular, each wavelet subband representing a particular signal component is split into code blocks 406, with each code block being composed of a number of coefficients.

The code blocks 406 are then provided to one or more modified entropy coding modules 408. As with most conventional coders, overall system performance is improved by providing a separate encoder for each code block. The modified entropy coder of the modified entropy coding modules 408 performs a dual function by encoding each code block 406 into a component bitstream 410, while at the same time outputting decoder pointers 412 that delineate the end of each coding pass for each code block.

The component bitstreams 410 and the decoder pointers 412 are then provided to a seamless multiplexing module 414. The seamless multiplexing module 414 then uses the decoder pointers 412 to synchronize multiplexing of the component bitstreams 410 into a master bitstream 416 as described in greater detail in Section 3.1. Note that this multiplexing of the component bitstreams may include the use of "mega components" (see Section 3.1) that are created from the seamless multiplexing of a number of subcomponents into "mega component" bitstreams and "mega component" decoder pointers. Thus, the seamless multiplexing module can be applied in a hierarchical way.

In addition, the seamless multiplexing module also outputs a "companion bitstream" 418. This companion bitstream 418 includes all information necessary for reshaping the master bitstream 416 to provide the desired form of the decoded output signal. Note that the information in the companion bitstream 418 is similar to the "demultiplexing aide" of the JPEG 2000 standard. However, unlike the "demultiplexing aide" of the JPEG 2000 standard, the information in the companion bitstream 418 is not embedded in the master bitstream 416. In fact, the only use for the companion bitstream 418 is to provide the necessary information for reshaping the master bitstream 416 via a bitstream reshaping module 420.

The bitstream reshaping module 420 reshapes the master bitstream 416 either by truncating the master bitstream for bitrate scalability, or by demultiplexing the master bitstream, and dropping one or more components, or by both. Note that such truncation and/or dropping of components for reshaping a bitstream is well known to those skilled in the art. After dropping components of the demultiplexed master bitstream 416, the bitstream reshaping module 420 then multiplexes the remaining component bitstreams, again using the decoder pointers 412, to create a reshaped bitstream 422.

Note that the reshaping of the master bitstream to achieve desired granularity of the input signal 402 is accomplished in response to instructions as to a desired signal output bitrate, granularity, or ROI. In a server/client type relationship (400/436), these instructions are typically provided by the client as a request to the server. The server then automatically reshapes the master bitstream and transmits it to the client via the network 434.

At this point, the reshaped bitstream 422 (or master bitstream 416) is then decoded for reconstructing a version original input signal 402. For example, in one embodiment, the reshaped bitstream 422 is provided to a seamless demultiplexing module 424. The seamless demultiplexing module 424 then demultiplexes the reshaped bitstream and provides the resulting bitstreams to one or more parallel decoder modules 426, one for each bitstream. The decoder modules 426 then output code blocks 428 which are provided to an inverse transform module 430. The inverse transform module 430 takes the code blocks 428 as an input and provides an output signal or media files that is a representation of the original input signal 402.

In the aforementioned client/server arrangement (400/436), demultiplexing, decoding and reconstruction of the input signal are completed on one or more client computers 436. In particular, in the client/server arrangement (400/436), the reshaped bitstream is provided from the server 400, across a network 434, such as the Internet, or other wired or wireless network, which then repeats the steps described above. For example, in the client/server configuration, the reshaped bitstream 422 is provided to a client seamless demultiplexing module 438. The seamless demultiplexing module 438 then demultiplexes the reshaped bitstream and provides the resulting bitstreams to one or more parallel decoder modules 440 residing on the client 436, one for each bitstream. The decoder modules 440 then output code blocks 442 which are provided to a client 436 inverse transform module 444. The inverse transform module 444 takes the code blocks 442 as an input and provides an output signal or media files that is a representation of the original input signal 446.

3.0 Operation Overview:

The above-described program modules are employed in a seamless multiplexer for automatically multiplexing and demultiplexing embedded bitstreams. This process is depicted in the flow diagrams of FIGS. 7 and 8 following a detailed operational discussion of exemplary methods for implementing the aforementioned programs modules.

3.1 Operational Elements:

The following sections describe in detail the operational elements for implementing the seamless multiplexer using the processes summarized above in view of FIG. 5 through FIG. 8. In general, the signal compression techniques described herein address the problem of large signal overhead in compressed multiplexed bitstreams by using a seamless multiplexer that using an encoder generated decoder pointer for multiplexing embedded bitstreams of a signal such as an audio signal, an image signal, or a video signal, without the need to use embed demultiplexing aides within the multiplexed bitstream.

3.1.1 Seamless Multiplexer:

As noted above, the seamless multiplexer uses decoder pointers to mark the end of each coding pass during entropy coding of the components of the input signal. These decoder pointers are then used for synchronizing the multiplexing of multiple embedded bitstreams representing the components of each input signal. The following paragraphs describe the use of decoder pointers in multiplexing such embedded bitstreams.

Figure 5:
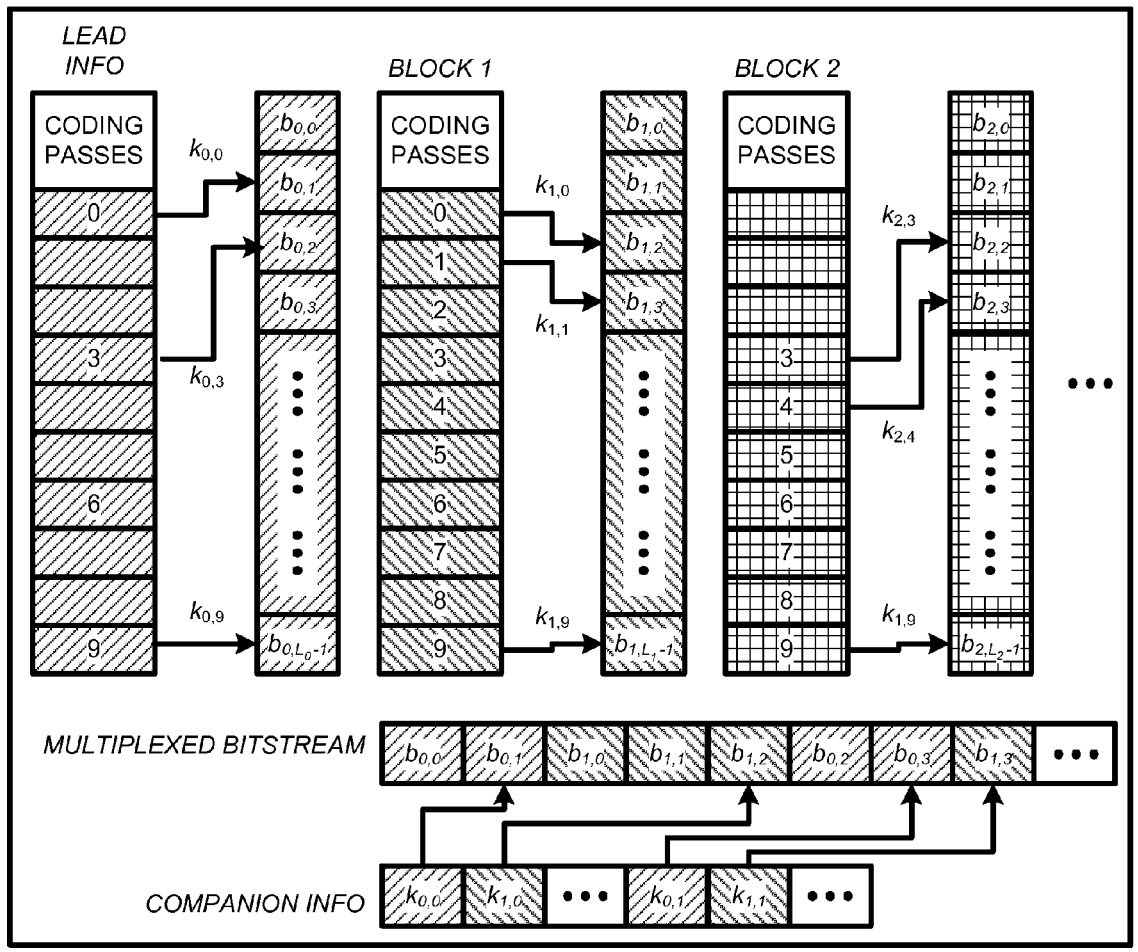
FIG. 5 is an exemplary coding pass diagram that illustrates seamless multiplexing of encoded bitstreams using decoder pointers.

In particular, let the bitstream of code block i be denoted as $s_i$, where $b_{i,j}$ is the $J^{th}$ bit of the compressed bitstream $s_i$. Further, let $k_{i,p}$ be the decoder pointer at the end of the $p^{th}$ coding pass, as shown in FIG. 5. Then, when encoding each code block, the first step is to determine the top bitplane $L_i$ (or the number of nonzero bitplanes) for each code block, which in turn determines the number of coding passes. With a multi-pass embedded coder such as JPEG 2000, each bitplane is further split into three coding passes, except the topmost bitplane. Therefore, a code block i with top bitplane value $L_i$ has $3 L_i-2$ coding passes. With the top bitplane (thus the number of coding passes) known, a code block encoder is invoked to encode each code block into an embedded bitstream with a known number of coding passes. The position of a decoder pointer at the end of each coding pass is recorded.

The top bitplane information of the neighbor code block may be correlated. A code block with a smaller top bitplane value is highly likely to reside in an area where its neighborhood code block also has a smaller top bitplane value. Moreover, it is not necessary to put the top bitplane value of all code blocks at the beginning of the multiplexed bitstream. At the $p^{th}$ coding pass, which is encoding $j(p)^{th}$ bit of the coefficient, it is only necessary to know whether the top bitplane value of a code block is larger than or equal to j(p). As an example, the multi-pass embedded coder of JPEG 2000 encodes bitplane $$j(p) = \left\lfloor L - \frac{p}{3} \right\rfloor$$

at a coding pass p, where L is the top bitplane of all coefficients, $\lfloor x \rfloor$ is the integer that is less than or equal to x.

Consequently, the seamless multiplexer creates a virtual "lead" code block $s_0$, which encoded into a bitstream $s_0$ the top bitplane value of code blocks. This lead bitstream first encodes the top bitplane of all coefficients L, which then determines the total number of coding passes of bitstream $s_0$, as well as the total number of coding passes of all code block bitstreams $s_i$. Next, the top bitplane value of the code blocks is encoded into the lead bitstream $s_0$, again with a multi-pass embedded coder, e.g., a conventional tagtree coder of JPEG 2000. Because the top bitplane value of the code blocks only needs to be encoded before the coding pass that encodes the actual bits, which always starts with a clean up pass, the bitstream piece of the lead bitstream may be aligned with the clean pass. The lead bitstream $s_0$ thus only contains information on a bitplane basis, and it only contains information at coding passes 0, 3, 6, 9, etc. Again, $k_{0,p}$ is used to record the position of the decoder pointer at the end of the $p^{th}$ coding pass.

An example of the lead bitstream and the code block bitstreams with multi-pass coding is provided in FIG. 5. Note that for purposes of explanation, FIG. 5 uses different shading to represent the bitstreams of different blocks.

As noted above, the multi-pass embedded coded bitstreams are seamlessly multiplexed without any demultiplexing aide. Moreover, a lead bitstream is created to record correlated information of the code blocks and the information that controls the coding pass of the code block, which, in this case, is the top bitplane value of the code blocks encoded by a multi-pass tagtree encoder. Multiplexing of the bitstreams is accomplished by stitching together a combined bitstream with the following order:

1) The $0^{th}$ bitstream piece of the lead bitstream,
2) The $0^{th}$ bitstream piece of the code blocks 1 ... N,
3) The $1^{st}$ bitstream piece of the lead bitstream,
4) The $1^{st}$ bitstream piece of the code blocks 1 ... N,
5) Etc.

An example of such a multiplexed bitstream is illustrated in FIG. 5. To decode the combined bitstream, a parallel array of N block decoders is initialized (one decoder for each code block), along with a tag tree decoder for the lead information. Then, using the tagtree decoder, the $0^{th}$ coding pass of the lead information is decoded first. The value L, which is the top bitplane of all coefficients, is recovered as well as those code blocks with top bitplane value above L. Since the decoder pointer was used in multiplexing of the bitstream, at the end of the $0^{th}$ coding pass of the lead information, the decoder pointer will point to the start of the next bitstream piece, which is the $0^{th}$ bitstream piece of the code block 1, if code block 1 has a top bitplane value above L. Starting at that point, the bitstream is simply channeled into the code block 1 decoder, and decoded until the end of the $0^{th}$ coding pass of code block 1. The decoder pointer then points to the $0^{th}$ bitstream piece of code block 2, and so on until the $N^{th}$ code block is decoded.

By performing demultiplexing on the fly during the decoding operation, in the manner described above, and successively channeling portions of the combined bitstream into specific decoders in a parallel array of decoders, the combined bitstream is simultaneously demultiplexed and decoded without the use of a demultiplexing aide (such as the length of the multiplexed bitstream piece and the number of coding passes). Further, if certain coding passes do not exist for certain code blocks, such as, for example, coding passes 0-2 of block 2 and coding passes 1-2 of the lead information as illustrated in FIG. 5, they are simply skipped to reduce computational complexity. However, the general idea is to keep the encoder and decoder in sync, and to skip the passes in both the encoder and decoder. Note that a code block always starts with a cleanup pass. It is for this reason that the bitstream piece of the lead information is included in the cleanup pass of the bitplane.

As noted above, the seamless multiplexed bitstream can be truncated for bitrate scalability. However, the bitstream does not contain the information needed to drop particular code block bitstreams (e.g., signal components) without performing the entropy decoding operation. For manipulations such as scaling by resolution and/or accessing by the spatial ROI, the length of the bitstream piece, which is the difference of two consecutive decoder pointers, is still required. However, as noted above, this information is included in a separate portion of the file, called the companion bitstream, as shown in FIG. 5.

Further, as noted above, the use of a companion bitstream is significantly different from the demultiplexing aide of the JPEG 2000 standard. In particular, as discussed above, the companion bitstream is only used for bitstream manipulation and is not needed in decoding. Thus in a scalable application such as Internet image browsing applications, the companion bitstream is only used by a server to reshape the compressed bitstream for transmission to one or more clients. The companion bitstream itself is not sent to the client. Therefore, from the point of the view of the client, a reshaped bitstream according to the required quality, resolution, and spatial ROI is provided without any demultiplexing aide, thereby reducing bitstream size while maintaining signal quality and increasing overall system performance.

Figure 9:
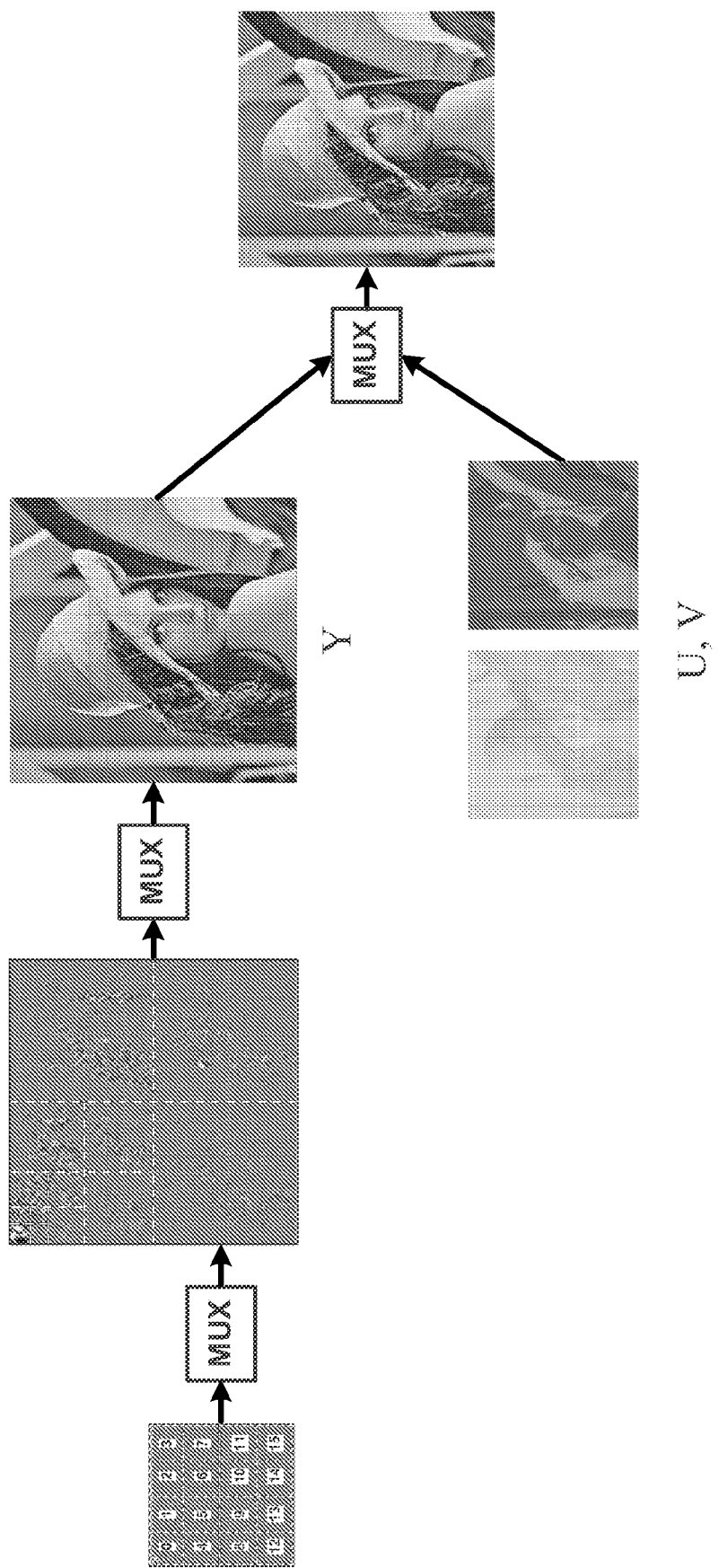
FIG. 9 illustrates an example of wavelet image coding wherein all code blocks within the same resolution level are first seamlessly multiplexed into a resolution mega bitstream and its decoder pointer, as described herein.

The seamless multiplexing is performed in a multi-level hierarchical way. For example, the code block bitstreams and its decoder pointer are first seamlessly multiplexed to a mega bitstream, with the decoder pointer of coding pass p being recorded as the position of the mega bitstream after all code block bitstreams of coding pass p have been multiplexed. Then, multiple mega bitstreams may be further seamlessly multiplexed based on the decoder pointers of the mega bitstreams only. As illustrated in FIG. 9, in wavelet image coding, all code blocks within the same resolution level are first seamlessly multiplexed into a resolution mega bitstream and its decoder pointer. After that, all resolution mega bitstreams are seamlessly multiplexed into gray(Y) or color(U,V) mega bitstreams, with only the decoder pointers of the resolution mega bitstreams. Finally, the gray(Y) and color(U,V) mega bitstreams are seamlessly multiplexed together to form the final master bitstream of the compressed image.

Through hierarchical seamless multiplexing, the companion bitstream is organized hierarchically. Further, and information of the companion bitstream may then be discarded if certain bitstream reshaping operations are unnecessary. For example, given the exemplary hierarchical seamless multiplexing scheme in FIG. 9, if the compressed bitstream is only going to be reshaped in terms of coding bitrate, and nothing else, the companion bitstream can be discarded, and the master compressed bitstream is simply truncated at the desired rate. Similarly, to reshape the master bitstream in terms of coding rate and color, the portion of the companion bitstream with the information of the gray(Y) and color(U,V) mega bitstreams is retained, and everything else is discarded. Similarly, to reshape the master bitstream in terms of coding rate, color and resolution, the portion of the companion bitstream with the information of the resolution mega bitstream is needed.

Only in the case that the master bitstream is to be reshaped in terms of coding rate, color, resolution and spatial region of interest (ROI), is all of the information of the code block bitstream in the companion bitstream actually needed. Consequently, with hierarchical seamless multiplexing, there is a trade off between the size of the companion bitstream and the granularity of access required. It is important to note that such a trade off can be reversed. In particular, in case certain information in the companion bitstream is discarded, and finer granularity of access is required, all that is needed is to decode the master bitstream once, record the decoder pointer of the code block bitstreams during the decoding process, and reconstruct a companion bitstream with finer granularity of access. Further reshaping of the master bitstream with finer granularity of access can then be done with the newly recovered companion bitstream.

Another advantage of the seamless multiplexer is that it in one embodiment, the seamless multiplexer makes use of dependencies among the code blocks and/or across the wavelet resolution level to further boost the compression performance. In particular, during bitstream reshaping, code block bitstreams can be dropped, and the combined bitstream can be truncated. However, the partial order of the coding passes of the code blocks never changes. Therefore, for any two blocks $i_1 < i_2$ and any coding pass j, coding pass j of block $i_2$ is coded after the coding pass j of block $i_1$, and before the coding pass j+1 of block $i_1$, no matter what reshaping operations have been applied. This fixed order of decoding facilitates the use of conventional interblock correlation techniques for achieving higher compression efficiencies. For example, in image coding, it may be desired to encode a code block using correlation of the coefficients at the same spatial location, but at different resolution levels, such as the approach employed by rate-distortion optimized embedding (J. Li and S. Lei, "An embedded still image coder with rate-distortion optimization", *IEEE Trans. On Image Processing*, Vol. 8, No. 7, pp. 913-924, July 1999.), the subject matter of which is incorporated herein by this reference. Experiment shows that such correlation may boost the image compression performance by 0.3-0.5 dB.

3.1.2 Entropy Coder Modification for Seamless Multiplexing:

Traditional entropy encoders and decoders, such as, for example, arithmetic coders and run-length encoders, are well known to those skilled in the art. Such encoders generally operate by turning an input string of symbols (i.e., transform coefficients) into a compressed bitstream. The decoder simply reverses this process.

However, in order for such encoders and decoders to be useful for seamless multiplexer, such coders should be modified to perform additional operations. In particular, as discussed above, the entropy encoder is modified to provide the decoder pointer, which is then used in multiplexing the bitstreams and synchronizing the position of the decoder after the coding of a particular symbol. Further, in order to ensure reliability, the entropy coder should also ensure that the compressed bitstream is long enough for the multiplexing. Similarly, the corresponding entropy decoder must account for the fact that the compressed bitstream can be truncated by decoding as much information as possible from the truncated bitstream. Consequently, rather than using purely conventional entropy coders and decoders, the seamless multiplexer uses modified versions of such conventional entropy coders and decoders.

For example, in a tested embodiment, a conventional entropy coder known as a QM adaptive arithmetic coder was modified to: 1) provide decoder pointers during coding of bitstreams; and 2) ensure that encoded bitstreams have sufficient length to be multiplexed by the seamless multiplexer. These modifications are described in detail below. However, it should be noted that the seamless multiplexer described herein is not intended to be limited to the use of the modified QM coder described below. In fact, it should be clear to those skilled in the art that modifications similar to those described below may easily be made to other conventional entropy coders, including, for example, conventional run-length entropy encoders. Further, any such modifications to existing entropy coders would serve to produce entropy coders suitable for use with the seamless multiplexer.

In particular, the aforementioned modification of the conventional QM arithmetic encoder provides a modified QM arithmetic encoder which finds decoder pointers after the coding of particular symbols and provides a modified flush process to ensure that the compressed bitstream is long enough for subsequent multiplexing operations.

In general, the QM-coder is based on the recursive probability interval subdivision of the well known Elias coder. For example, let $S_0 S_1 S_2 \ldots S_n$ be a series of binary bits that is sent to the arithmetic coder. The QM coder maintains a probability interval (C, C+A). Then, every time an input symbol $S_i$ is encoded, the probability interval subdivides into two. One of the subdivisions then becomes the new probability interval depending upon whether the input symbol is '0' or '1'. At the end of coding, the arithmetic coder outputs a sequence of compressed bits $k_1 k_2 \ldots k_m$, where m is the bitstream length. Further, there is an uncertainty interval in the bitstream where the lower and upper bound are determined as illustrated by Equation 2:

$$\begin{cases} Lowerbound & B = 0.k_1 k_2 \ldots k_m 000 \ldots \\ Upperbound & D = 0.k_1 k_2 \ldots k_m 111 \ldots \end{cases} \quad \text{Equation 2}$$

As long as the uncertainty interval (B, D) is contained in the probability interval (C, C+A) created by the symbol string, the bitstream uniquely identifies the final probability interval, and thus uniquely identifies each subdivision/input symbol.

Figure 6:
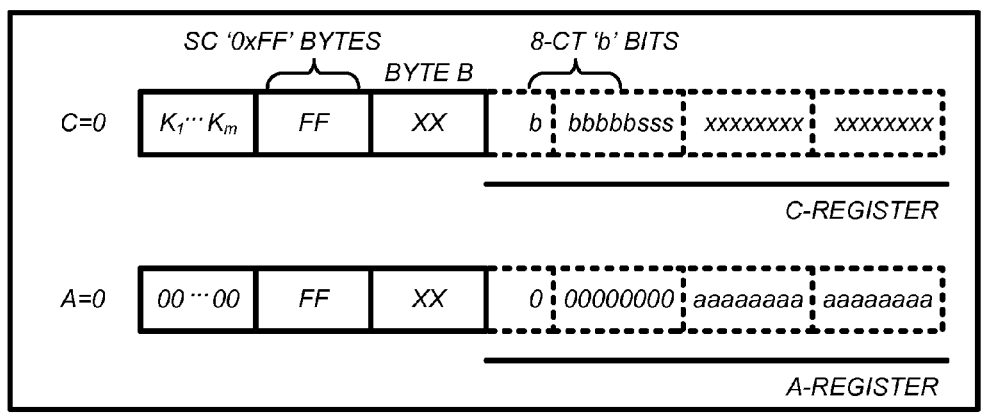
FIG. 6 illustrates an exemplary interim representation of the coding interval of a QM arithmetic coder.

As is known to those skilled in the art, in the QM arithmetic coder, subinterval parameters C and A are represented with finite precision as illustrated in FIG. 6, where $K_2 \ldots K_m$ are bytes already output by the QM coder, byte 'B' and SC number of '0xFF' bytes are held by the QM coder for a carry-over operation. Further, there is a C- and A-register, which contains fractional bits of C and A, respectively.

Further, although the encoder pointer is at $K_m$, the decoder pointer goes all the way to the least significant bit of the C- and A-register. The reason for this is because after decoding the current symbol, the A-register is exactly the same as that after the encoding, and all bits up to the end of the C-register need to be read in by the decoder.

In addition, as is well known to those skilled in the art, the conventional QM entropy encoder involves a "flushing operation." In operation, after all symbols are encoded, the conventional QM entropy encoder only outputs part of the bits of the C-register to build an uncertainty interval (B, D) that is just smaller than the final probability interval (C, C+A). Further, bytes of '0x00' may be removed from the end of the bitstream.

However, the modified QM entropy encoder no longer performs either of those flushing operations in the manner of the conventional QM coder. In particular, all bits up to the last decoder pointer (i.e., all bits in the C-register after the last symbol is encoded) are needed for subsequent demultiplexing. As a result, the revised QM entropy encoder outputs more bits at the end than the conventional QM coder. Fortunately, the code block bitstream is further truncated at the bitstream assembler stage, with the truncation point typically being far from the bitstream end. As a result, additional bits stuffed by the revised flushing process are usually dropped, and do not adversely affect the compression efficiency in most cases. The point of this particular modification is to ensure proper demultiplexing and decoding of the combined bitstream.

The conventional QM entropy decoder assumes that the number of symbols to be decoded is known, and describes the decoding operation accordingly. However, with embedded coding and bitstream truncation, the number of decodable symbols becomes unknown. Therefore, the modified QM decoder continuously decodes symbols until an uncertainty interval (B, D) created by the truncated bitstream is not contained in any of the two subdivisions of the current interval (C, C+A). This condition is referred to as a "decoder terminate condition," because only upon that point, the current symbol becomes uncertain and undecodable. Further, when the end of the combined bitstream is reached, although all bitstreams have been distributed to the entropy decoder, there is typically still decodable information left in each decoder. Therefore, the QM entropy decoder is simply modified by adding a sweeping operation to decode as many symbols as possible until a "decoder terminate" condition is satisfied.

3.2 System Operation:

The program modules described in Section 2.2 with reference to FIG. 4, and in view of the detailed description provided in Section 3.1, are employed for using encoder generated decoder pointers for multiplexing embedded bitstreams of a signal without the need to use embed demultiplexing aides within the multiplexed bitstream. This process is depicted in the flow diagrams of FIG. 7 and FIG. 8, which illustrate multiplexing and demultiplexing, respectively, of embedded bitstreams generated form an input signal. It should be noted that the boxes and interconnections between boxes that are represented by broken or dashed lines in FIG. 7 and FIG. 8 represent alternate embodiments of the seamless multiplexer, and that any or all of these alternate embodiments, as described below, may be used in combination.

Figure 7:
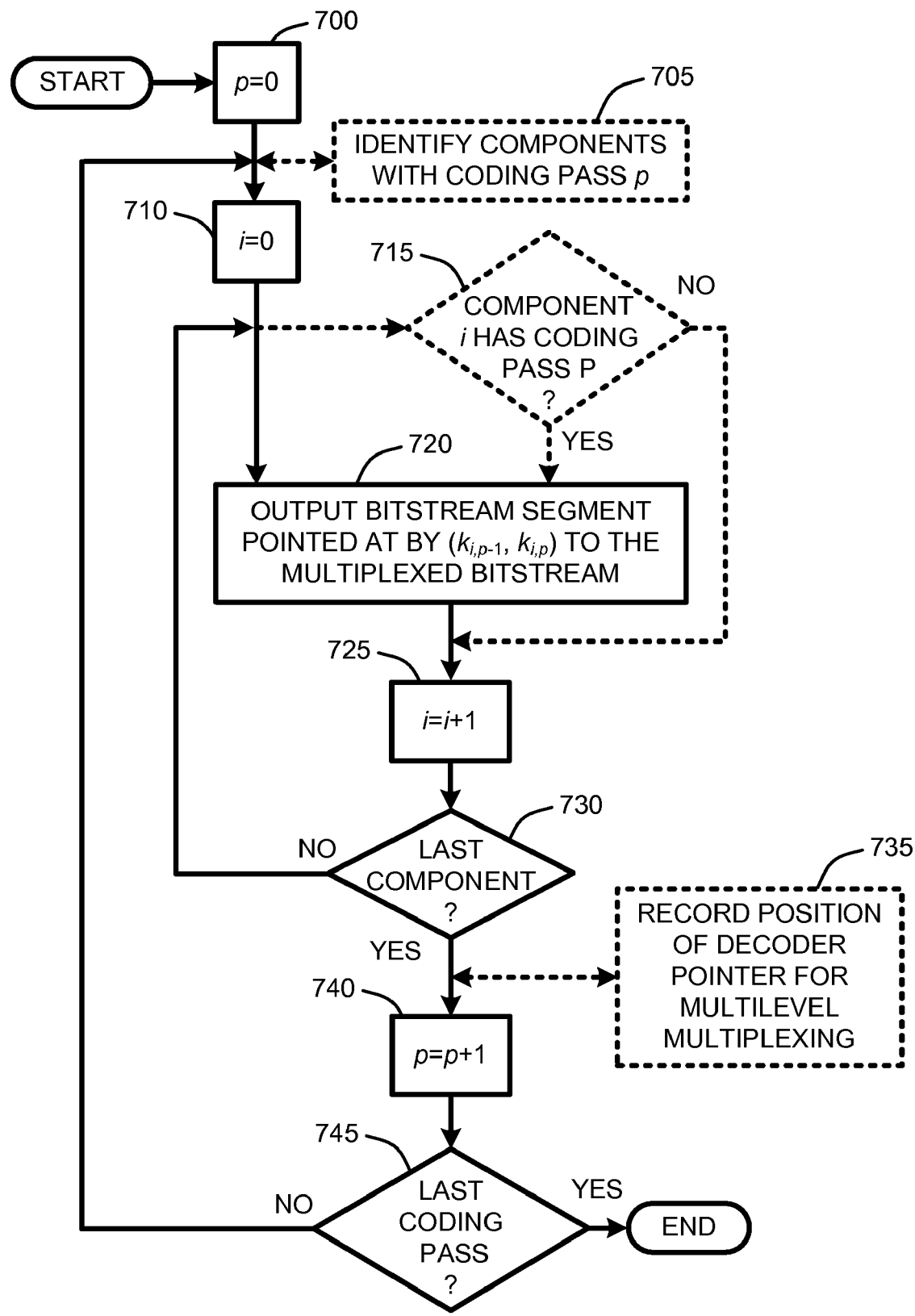
FIG. 7 illustrates an exemplary system flow diagram for providing seamless multiplexing of encoded bitstreams using decoder pointers.
Figure 8:
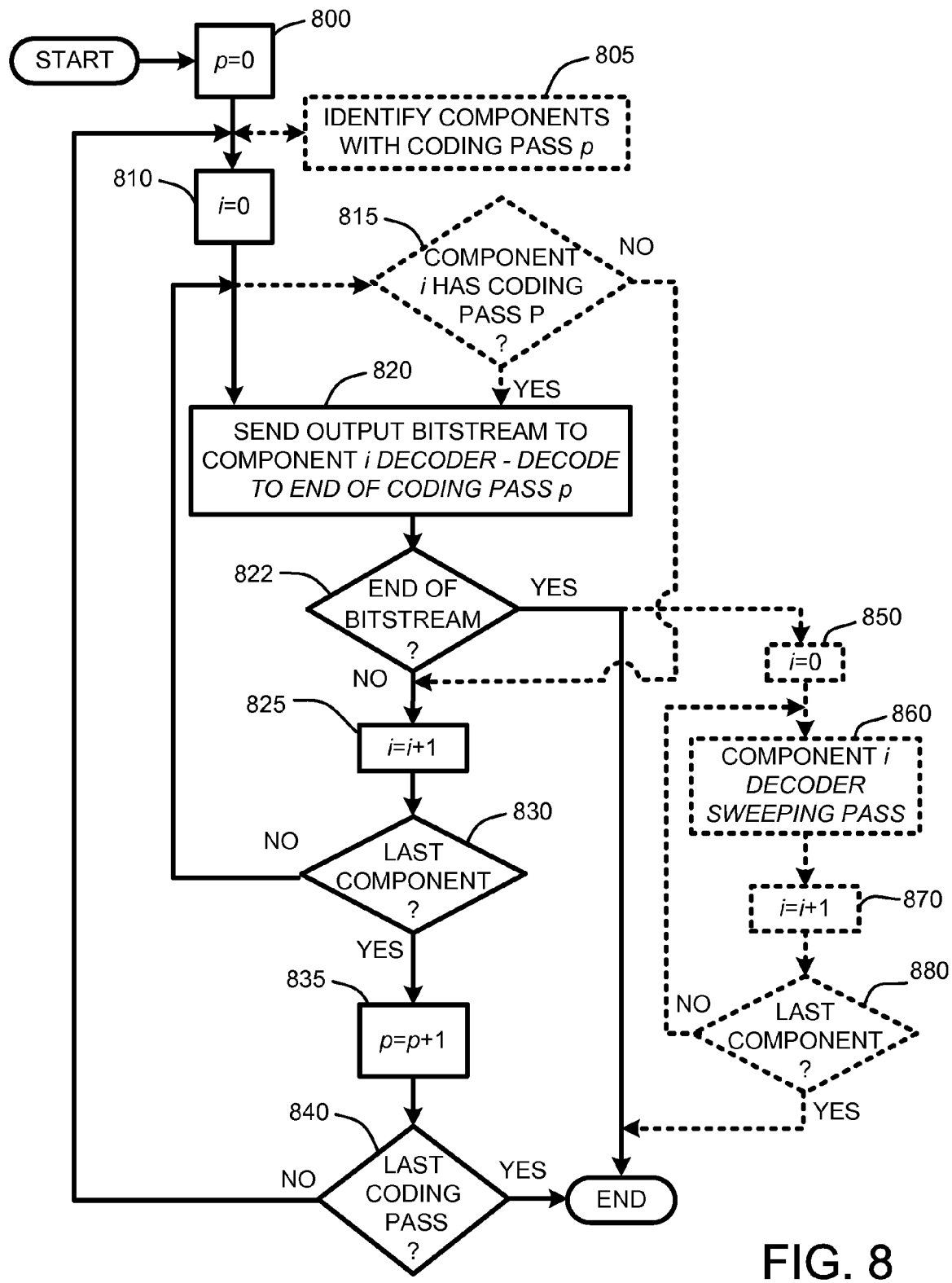
FIG. 8 illustrates an exemplary system flow diagram for providing seamless demultiplexing and decoding of encoded bitstreams using decoder pointers.

Referring now to FIG. 7 in combination with FIG. 4, the process can be generally described as a seamless multiplexer that using a modified entropy encoder to generate decoder pointers during an initial signal encoding step. Next, these decoder pointers are used in multiplexing individual component bitstreams derived from the input signal to create a master bitstream, or a mega bitstream and its decoder pointer which will be used in further seamless multiplexing operations.

In particular, as illustrated by FIG. 7, operation of the seamless multiplexer encoding system begins by initializing a coding pass counter p to zero 700. Next, a component pointer that points to the $i^{th}$ component is also initialized to zero 710. The next step is to simply output the bitstream component pointed at by decoding pointers ($k_{i,p-1}$, $k_{i,p}$) to the multiplexed bitstream 720. In case different components have different numbers of coding passes, optional step 705 identifies the component that has coding pass p, e.g., with information encoded in the lead bitstream, and optional step 715 skips the component if it does not have a coding pass p. Next, the component pointer i is incremented 725. A check is then made as to whether the last component has already been processed 730. If the last component has not been processed, then with i having been incremented 725, the next piece of the multiplexed bitstream 720 is added by simply again outputting the bitstream component pointed at by decoding pointers ($k_{i,p-1}$, $k_{i,p}$). This process of incrementing the component pointer i and outputting the next piece of the multiplexed bitstream continues until the last component has been processed 730.

At this point, if the output bitstream is a mega bitstream which is to be further seamlessly multiplexed, the length of the currently output bitstream is recorded as the decoder pointer of the mega bitstream. Afterwards, the coding pass counter p is incremented 740. A check is then made as to whether the last coding pass has been processed 745. If the last coding pass has not been processed, then the component pointer i is again initialized to zero 710. The steps described above for outputting bitstream segments for each component i are then repeated with the coding pass counter p set to 1, then 2, and so on, until the last coding pass p has been processed 745, at which time the seamlessly multiplexed bitstream has been completely assembled.

The process described above is basically reversed in the decoding stage, for simultaneously demultiplexing and decoding the master bitstream, or a reshaped bitstream. In particular, as illustrated by FIG. 8, operation of the seamless multiplexer decoding system begins by initializing a coding pass counter p to zero 800. Next, a component pointer that points to the $i^{th}$ component is also initialized to zero 810. The next step is to sequentially channel bitstream segments to a decoder for component i, and continue decoding to the end of coding pass p. In case different components have different numbers of coding passes, optional step 805 identifies the component that has coding pass p, e.g., with information decoded from the coding pass p of the lead bitstream, and optional step 815 skips the component if it does not have a coding pass p.

Next, a check is made 822 as to whether the input bitstream has been exhausted, i.e., reached the end. If the input bitstream reaches the end, the seamless demultiplexing and decoding is ended. Alternately, an optional sweeping stage 850-880 is performed to further improve the performance of embedded decoding.

Next, the component pointer i is incremented 825. A check is then made as to whether the last component has already been processed 830 at coding pass p. If the last component has not been processed, then with i having been incremented 825, the next step is to sequentially channel bitstream segments to a decoder specific to component i+1, and continue decoding to the end of coding pass p. Once the last component has been processed 830, then the coding pass p is incremented.

Next, a determination is made as to whether the last coding pass has been processed 840. If it has been processed, then the multiplexed bitstream has been demultiplexed and decoded. However, if the last coding pass has not been processed 840, then the component pointer i is reset to zero, and the process described above repeats until such time as the last component has been processed 830 and the last coding pass has been processed 840.

When the end of the input bitstream has been reached, an optional sweeping process can be launched. The component pointer that points to the $i^{th}$ component is again initialized to zero 850. The next step is to perform a sweeping process 860 of component i decoding, so that as much information as possible is decoded from component i. Next, the component pointer i is incremented 870. A check is then made as to whether the last component has already been processed 880. If the last component has not been processed, then with i having been incremented 870, the next step is to perform the sweeping process of component i+1, and continue decoding as much information as possible from component i+1. Once the last component has been processed 880 then the decoding ends.

The foregoing description of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A system for decoding one or more multiplexed signals, comprising:
   a device for receiving an multiplexed signal, said signal comprising two or more multiplexed signal components;
   a device for providing a separate entropy decoder corresponding to each signal component;
   a device for sequentially selecting each signal component of the multiplexed signal as a current signal component, and for each current signal component, channeling bitstream segments of the multiplexed signal corresponding to the current signal component to a corresponding entropy decoder; and
   for each current signal component, a device for decoding the current signal component to an end of a current coding pass using the corresponding entropy decoder to produce a signal component bitstream for each of the signal components.

2. The system of claim 1 further comprising a device for inverse transforming one or more of the signal component bitstreams to generate a decoded signal.

3. system of claim 2 wherein the decoded signal is any of an audio file comprising one or more audio channels, a video file comprising one or more images, and a combined audio-video file comprising one or more audio channels and one or more images.

4. The system of claim 1 wherein the multiplexed signal further comprises a lead bitstream, said lead bitstream identifying a number of coding passes associated with each multiplexed signal component.

5. The system of claim 1 further comprising a device for applying a sweeping pass for each signal component, said sweeping pass being applied to each signal component after an end of the multiplexed signal has been reached.

6. The system of claim 1 further comprising a device for recording decoder pointers for each current signal component while decoding the current signal component.

7. The system of claim 6 further comprising a device for constructing a companion bitstream from the decoded signal component bitstreams for each of the signal components and the decoder pointers, said companion bitstream including information elements for reshaping the multiplexed bitstream.

8. A computer-implemented process for decoding a multiplexed bitstream, comprising using a computing device to perform process actions for:
   initializing a block of parallel decoders, said block of decoders including a number of entropy decoders equal in number, and having a one-to-one correspondence, to a number of signal component coefficient bitstreams representing coefficient code blocks embedded in the multiplexed bitstream; and
   for each segment of the multiplexed bitstream, simultaneously decoding and demultiplexing the multiplexed bitstream by sequentially channeling the multiplexed bitstream to the corresponding decoder to decode the current coding pass of the bitstream; and
   combining all the corresponding coding passes of the code block pieces to generate a plurality of decoded code block bitstreams, each code block bitstream representing a signal component.

9. The computer implemented process of claim 8 further comprising inverse transforming one or more of the code block bitstreams to generate a decoded signal.

10. The computer implemented process of claim 9 wherein the decoded signal is any of an audio file comprising one or more audio channels, a video file comprising one or more images, and a combined audio-video file comprising one or more audio channels and one or more images.

11. The computer implemented process of claim 8 further comprising:
- a lead bitstream included in the multiplexed bitstream, said lead bitstream defining a number of coding passes used for encoding each code block bitstream;
- decoding the lead bitstream using a tagtree decoder, said tagtree decoder being included in the block of parallel decoders; and
- for each coding pass, skipping particular entropy coders where the number of coding passes defined by the lead bitstream for encoding each code block bitstream indicates that a corresponding code block did not have a coding pass for the current coding pass.

12. The computer implemented process of claim 8 further comprising a sweeping pass for each signal component, said sweeping pass being applied to each signal component after an end of the multiplexed signal has been reached.

* * * * *

UNITED STATES PATENT AND TRADEMARK OFFICE
CERTIFICATE OF CORRECTION

| | | |
|---|---|---|
| PATENT NO. | : 7,840,079 B2 | Page 1 of 1 |
| APPLICATION NO. | : 12/348777 | |
| DATED | : November 23, 2010 | |
| INVENTOR(S) | : Jin Li | |

It is certified that error appears in the above-identified patent and that said Letters Patent is hereby corrected as shown below:

In column 20, line 27, in Claim 3, before "system" insert -- The --.

Signed and Sealed this
Second Day of August, 2011

David J. Kappos
*Director of the United States Patent and Trademark Office*